United States Patent
Gupta et al.

(10) Patent No.: US 8,588,745 B2
(45) Date of Patent: Nov. 19, 2013

(54) COMMUNICATIONS SYSTEM

(75) Inventors: Neeraj Gupta, Tokyo (JP); Jagdeep Singh Ahluwalia, Tokyo (JP); Francesca Serravalle, Sorrey (GB)

(73) Assignee: NEC Corporation, Tokyo (JP)

( * ) Notice: Subject to any disclaimer, the term of this patent is extended or adjusted under 35 U.S.C. 154(b) by 231 days.

(21) Appl. No.: 12/737,746

(22) PCT Filed: Aug. 4, 2009

(86) PCT No.: PCT/JP2009/064081
§ 371 (c)(1),
(2), (4) Date: Feb. 11, 2011

(87) PCT Pub. No.: WO2010/018801
PCT Pub. Date: Feb. 18, 2010

(65) Prior Publication Data
US 2011/0136473 A1    Jun. 9, 2011

(30) Foreign Application Priority Data
Aug. 12, 2008    (GB) .................................. 0814731.6

(51) Int. Cl.
*H04M 1/66*    (2006.01)
(52) U.S. Cl.
USPC ........ 455/411; 455/561; 455/433; 455/435.2; 455/432.1; 455/432.3; 455/435.1
(58) Field of Classification Search
USPC ........ 455/411, 561, 432.2, 433, 435.1, 435.2, 455/438, 436, 437
See application file for complete search history.

(56) References Cited

U.S. PATENT DOCUMENTS

| | | |
|---|---|---|
| 2003/0086539 A1 | 5/2003 | McCalmont et al. |
| 2004/0184584 A1 | 9/2004 | McCalmont et al. |

FOREIGN PATENT DOCUMENTS

| | | |
|---|---|---|
| CN | 1582563 A | 2/2005 |
| EP | 1 447 945 A2 | 8/2004 |
| GB | 2 359 701 A | 8/2001 |
| GB | 2 437 346 A | 10/2007 |
| WO | WO 2007/020528 A2 | 2/2007 |
| WO | WO 2008/095428 A1 | 8/2008 |
| WO | WO 2008/128449 A1 | 10/2008 |

OTHER PUBLICATIONS

R3-081995, 3GPP TSG-RAN WG3 #61, Korea, Jeju, Aug. 18-22, 2008.
NEC: "Resource Optimization for UE-EPC Signalling transfer", 3GPP Draft; R3-081994, 3rd Generation Partnership Project (3GPP), F-06921 Sophia-Antipolis Cedex; France, vol. RAN WG3, No. Jeju Island; Aug. 13, 2008, XP050165054.

(Continued)

*Primary Examiner* — David Q Nguyen
(74) *Attorney, Agent, or Firm* — McGinn Intellectual Property Law Group, PLLC (57) ABSTRACT

A cellular communications system is provided in which a user device sends a Service Request to a Mobility Management Entity together with parameter data that depends on the service that is requested. The Mobility Management Entity then determines from the parameter value if AS security is required to provide the requested service. If it is not, then the Mobility Management Entity accepts the Request without providing security parameters for establishing another signalling radio bearer so that an existing signalling radio bearer is used to provide the requested service. If it is, then the Mobility Management Entity accepts the Request and provides security parameters for establishing another signalling radio bearer to be used in providing the requested service.

29 Claims, 9 Drawing Sheets

(56) References Cited

OTHER PUBLICATIONS

NEC: "UE-EPC Signalling Setup: S1AP corrections", 3GPP Draft; R3-082690, 3rd Generation Partnership Project (3GPP); F-06921 Sophia-Antipolis Cedex; France, No. Phoenix; Oct. 13, 2008, XP050309581.

3GPP:"3rd Generation Partnership Project ; Technical Specification Group Services and System Aspects; Circuit Switched Fallback in Evolved Packet System; Stage 2 (Release 8)", 23272-200, 3rd Generation Partnership Project (3GPP), F-06921 Sophia-Antipolis Cedex; France; vol. TSG SA, No. Prague, Czech Republic; Jun. 2, 2008, XP050211042.

3GPP: "3rd Generation Partnership Project ; Technical Specification Group Services and System Aspects: GPRS enhancements for E-UTRAN access (Release 8)", 23401-200; F-06921 Sophia-Antipolis Cedex; France, vol. SA WG2, No. Marina del Rey; Dec. 18, 2007, XP050262522.

3GPP: "3rd Generation Partnership Project ; Technical Specification Group Core Network and Terminals; Non-Access-Stratum (NAS) protocol for Evolved Packet System (EPS); Stage 3 (Release 8)"; 24301-040, 3rd Generation Partnership Project (3GPP); F-06921 Sopiha-Antipolis Cedex; France, No. Budapest, Hungary; Aug. 11, 2008, XP050308126.

Chinese Office Action dated Apr. 3, 2013 with partial English translation thereof.

COMMUNICATIONS SYSTEM

TECHNICAL FIELD

The present invention relates to cellular communication devices that operate in accordance with the Long Term Evolution (LTE) of UTRAN (called Evolved Universal Radio Access Network (E-UTRAN)) as well as to the operation of communication nodes within E-UTRAN and within the core network. The invention has particular relevance to the provisioning of a short messaging service for the cellular communication devices.

BACKGROUND ART

Technical Specification 3GPP TS 24.301 V0.4.0 defines various protocols for communications between User Equipment (UE) and a Mobility Management Entity (MME) within the core network via an E-UTRAN base station (e-NodeB). In general terms, this technical specification defines that whenever the MME receives a Non-Access Stratum (NAS) message "Service Request" from the UE, the MME will always activate Access Stratum (AS) security. The inventors have identified that this may be sub-optimal for some types of services that are provided, such as the Short Messaging Service (SMS).

More specifically, a Service Request procedure is required to trigger the transition from ECM Idle to ECM Connected which establishes the radio and S1 bearers. (ECM stands for EPS (Evolved Packet System) Connection Management.) This procedure is required when:
    the network has downlink signalling pending;
    the UE has uplink signalling pending;
    the UE or the network has user data pending and the UE is in ECM-IDLE mode;
    the UE in ECM-CONNECTED mode, has uplink user data to be sent and the user plane radio bearers are not established; or
    the UE in ECM-IDLE or ECM-CONNECTED mode and has requested to perform mobile originating/terminating CS fallback.

Figure 6:
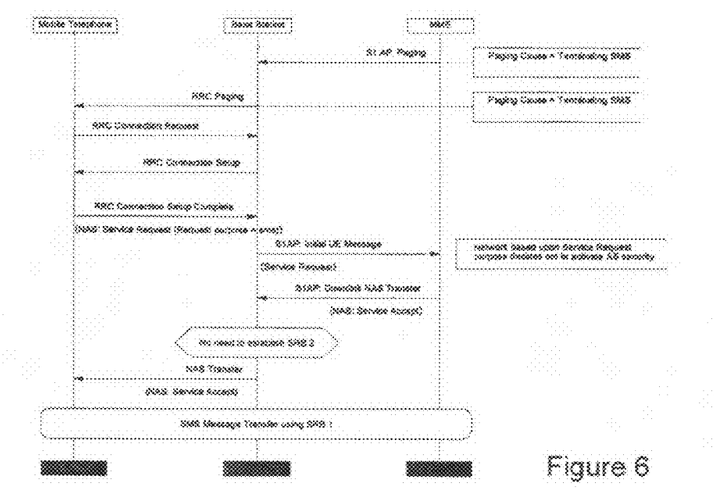
FIG. 6 is a signalling diagram illustrating the signalling performed in the system shown in FIG. 1 when a short text message is to be transmitted to the mobile telephone from the network.
Figure 7:
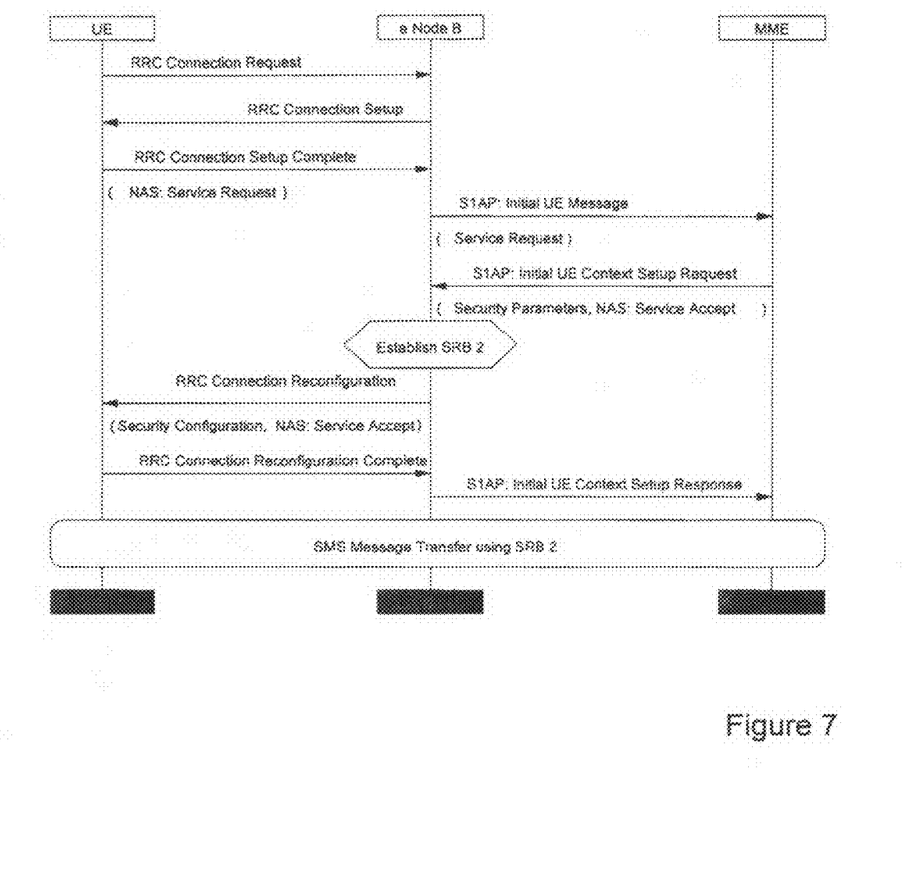
FIG. 7 is a signalling diagram illustrating a prior art technique for operating a communication system when a short text message is to be transmitted.

FIG. 6 illustrates the message flow between the UE, the eNodeB and the MME for the Short Message Service transfer between the UE and Evolved Packet Core Network. As shown, the UE initially sends an RRC connection Request message to the eNodeB and, once it receives RRC Connection set up message from the e Node B, the UE sends an RRC Connection Setup Complete message together with a NAS: Service Request message. NAS Service Request message may also be sent by the UE in an uplink NAS RRC message. In response to receiving this message, the eNodeB sends the MME an S1AP: Initial UE Message including the NAS message Service Request. This Service Request is a generic request regardless of the service that is ultimately wanted by the UE. In response to receiving the Service Request, the MME activates AS security and transmits an S1AP: Initial UE Context Setup Request back to the eNodeB together with the required Security Parameters and a Service Accept message. This causes the eNodeB to activate security and establish a new Signalling Radio Bearer (SRB2) with the UE. Once this new signalling radio bearer has been established, this new signalling bearer can be used for SMS message transfer between the UE and the network.

DISCLOSURE OF THE INVENTION

The inventors have realised that this process is not optimised. For services like Short Message Transfer, NAS security is already in place there is no need for the network to activate Access Stratum security. The present invention aims to address this problem by changing the protocol so that the UE transmits data that depends on the purpose of the Service Request to the MME via the eNodeB, so that the MME can decide, based on the purpose of the Service Request, whether or not to activate Access Stratum security.

According to one aspect, the invention addresses this problem by providing a network that determines whether or not to activate Access Stratum security for a requested service based on the purpose of the request. In this way, AS security does not need to be activated if it is not required, as is the case for the Short Message Service.

One embodiment of the present invention provides a mobile communications system comprising a mobile communications device, a base station and a network communications node,
    wherein the mobile communications device comprises: means for generating a Service Request; means for sending the Service Request to the base station; means for receiving a Service Accept message from the base station; and means for transferring data with the base station using an existing radio bearer to provide the service requested in the Service Request; wherein the base station comprises: a first receiver for receiving a Service Request from the mobile communications device; a first sender for sending the Service Request to a network communications node; a second receiver for receiving a Service Accept message from the network communications node; a second sender for sending the Service Accept message to the mobile communications device; and means for transferring data with the mobile communications device using an existing radio bearer to provide the service requested in the Service Request;
    wherein the network communications node comprises: means for receiving a Service Request from a base station; means for obtaining a parameter value that depends upon the purpose of the Service Request; means for determining if security is required to be activated for the requested service based on said parameter value; and means for sending a Service Accept message to the base station without security parameters if said determining means determines that security is not required to be activated.

The invention also provides the above mobile communications device, the above base station and the above network communications node and the methods performed thereby.

The network communications node may obtain the parameter value from data held locally or from the base station. In one embodiment, the mobile communications device sends the parameter value and said Service Request together to said base station. This may be done using a first signalling radio bearer and the transferring means may use the same signalling radio bearer to transfer the data with the base station.

The parameter value that is transmitted by the mobile communications device may identify the service that is requested or it may identify whether or not AS security is required. In the latter case, the mobile communications node will determine from the purpose of the requested service, if AS security will be required and then set the parameter value (which may be a binary value) accordingly. In the former case, the network communications node may compare the received parameter value with stored data to determine whether or not security is required to be activated.

If AS security is required, then the network communications device is operable to cause the base station to establish another signalling radio bearer with the mobile telephone on which NAS signalling to be transferred between the base station and the mobile communications device is to be carried.

The present invention also provides a computer implementable instructions product comprising computer implementable instructions for causing a programmable computer device to become configured as the above cellular device or as the above base station or as the above network communications node. The product may include a computer readable medium or a signal that carries the instructions.

BRIEF DESCRIPTION OF THE DRAWINGS

These and various other aspects of the invention will become apparent from the following detailed description of embodiments which are described, by way of example only, with reference to the accompanying Figures in which.

BEST MODE FOR CARRYING OUT THE INVENTION

Overview

Figure 1:
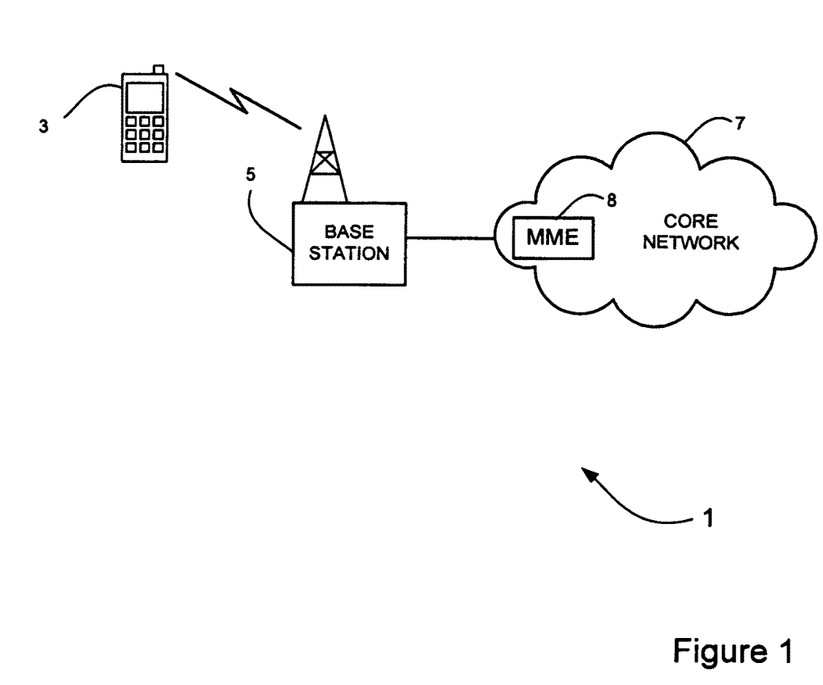
FIG. 1 schematically illustrates a mobile telecommunication system of a type to which the embodiment is applicable.

FIG. 1 schematically illustrates part of a mobile (cellular) telecommunications system 1 having a mobile telephone (MT) 3, a base station 5 and a core network 7. A user of the mobile telephone 3 can communicate with other users via the base station 5 and the core network 7. As shown, the core network 7 includes a Mobility Management Entity (MME) 8 which is responsible for, among other things, tracking the mobile telephone 3, control signalling for handovers when the mobile telephone is moving from one base station 5 to another; bearer activation and deactivation etc. Non-Access Stratum (NAS) signalling terminates at the MME 8 and the MME 8 is responsible for managing security keys used for NAS signalling.

As will be described in more detail below, in this embodiment, when the user of the mobile telephone 3 wishes to request a service, the mobile telephone 3 transmits a Service Request to the MME 8 via the base station 5, which Service Request includes data relating to the purpose of the request (i.e. details of the service that is wanted). In response to receiving this Service Request, the MME 8 decides if Access Stratum (AS) security is required. If it is not, then the MME 8 issues a Service Accept message without activating AS security and as a result Signalling Radio Bearer 2 (SRB2) does not need to be established. If the Service Request relates to a service that does require AS security, such as a request for a mobile originating or a mobile terminating call, then the MME 8 would reply to the Service Request with the required Security Parameters for setting up Signalling Radio Bearer 2 (SRB2).

Base Station

Figure 2:
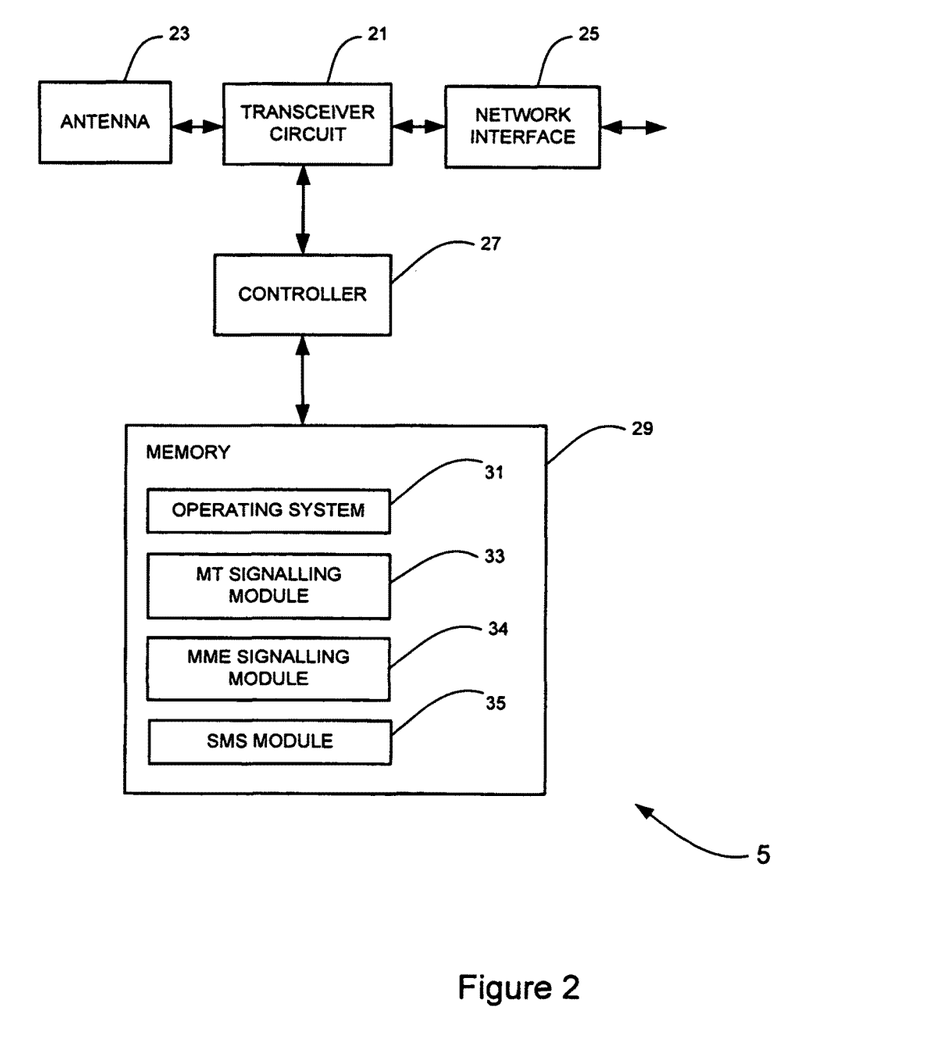
FIG. 2 is a block diagram illustrating components of an E-UTRA base station forming part of the system shown in FIG. 1.

FIG. 2 is a block diagram illustrating the main components of the base station 5 used in this embodiment. As shown, the base station 5 includes a transceiver circuit 21 which is operable to transmit signals to and to receive signals from the mobile telephone 3 via one or more antennae 23 and which is operable to transmit signals to and to receive signals from the core network 7 via a network interface 25. A controller 27 controls the operation of the transceiver circuit 21 in accordance with software stored in memory 29. The software includes, among other things, an operating system 31, an MT signalling module 33, an MME signalling module 34 and an SMS module 35. The MT signalling module 33 controls the signalling with the mobile telephone 3, the MME signalling module 34 controls the signalling with the MME 8; and the SMS module 35 controls the transfer for the SMS message between the mobile telephone 3 and the core network 7.

Mobile Telephone

Figure 3:
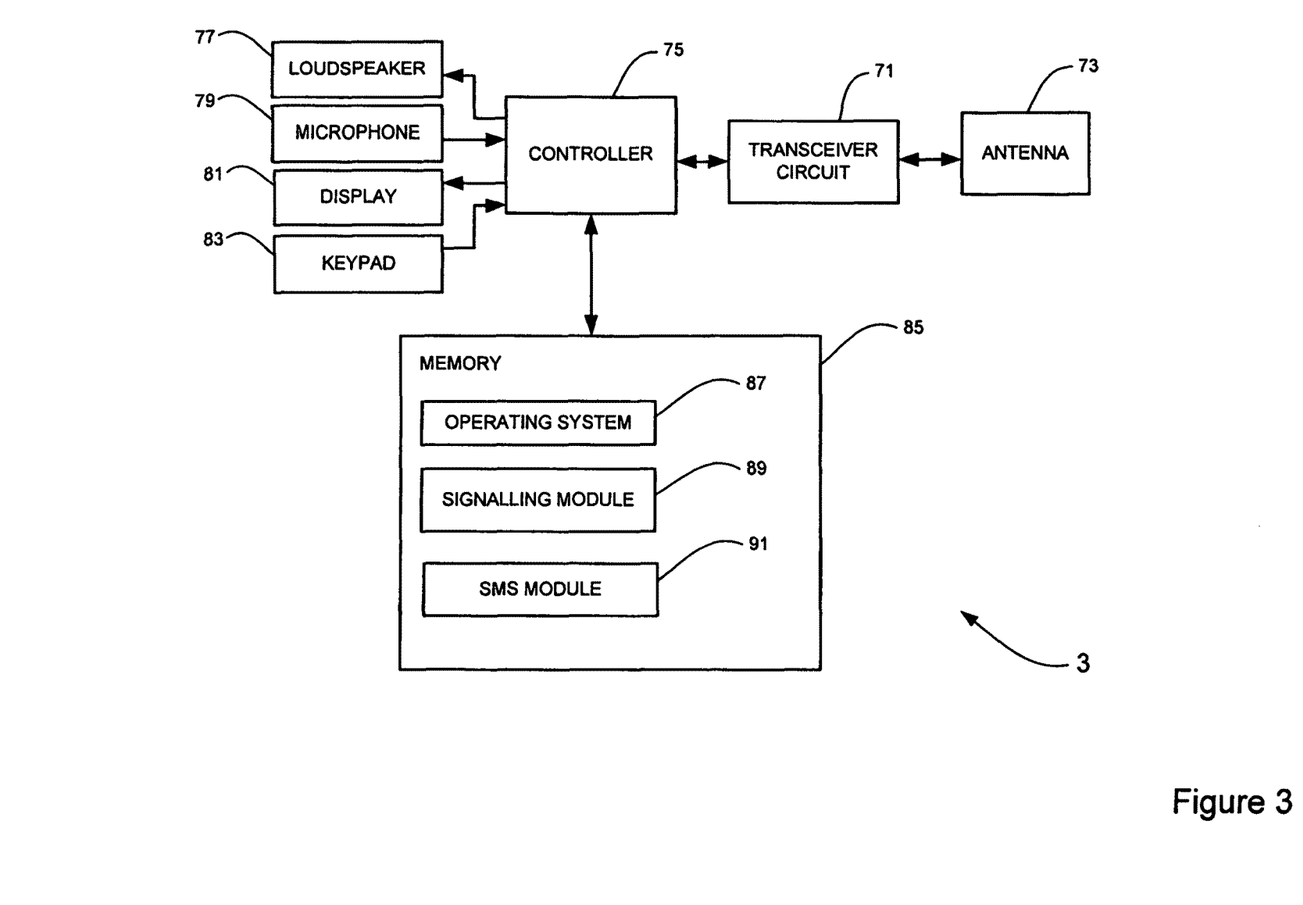
FIG. 3 is a block diagram illustrating components of a cellular communication device forming part of the system shown in FIG. 1.

FIG. 3 schematically illustrates the main components of the mobile telephone 3 shown in FIG. 1. As shown, the mobile telephone 3 includes a transceiver circuit 71 that is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software modules stored within memory 85. As shown, these software modules include, among other things, an operating system 87, a signalling module 89 and an SMS module 91. The signalling module 89 controls the signalling of control messages with the base station 5 and the SMS module 91 controls the user interface and transmission/reception of SMS messages to/from the base station 5.

MME

Figure 4:
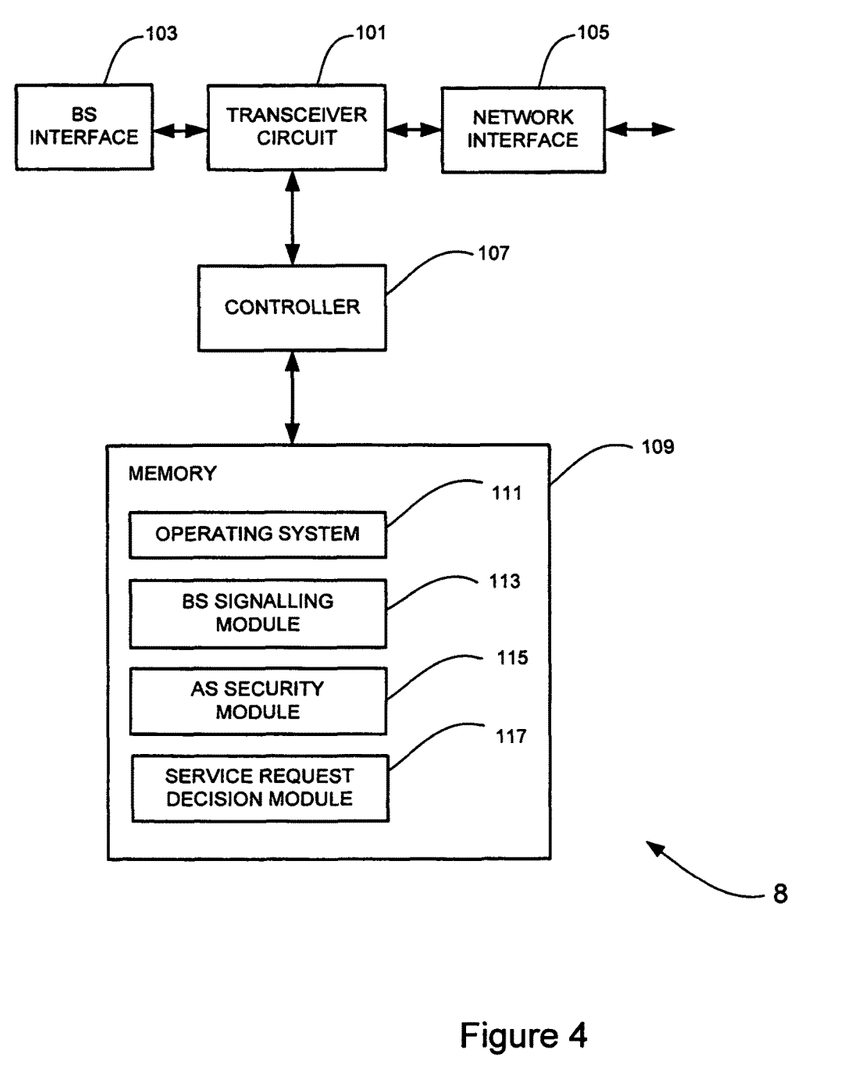
FIG. 4 is a block diagram illustrating components of a Mobility Management Entity forming part of the core network shown in FIG. 1.

FIG. 4 is a block diagram illustrating the main components of the MME 8 used in this embodiment. As shown, the MME 8 includes a transceiver circuit 101 which is operable to transmit signals to and to receive signals from the base station 5 via a base station interface 103 and which is operable to transmit signals to and to receive signals from the core network 7 via a network interface 105. A controller 107 controls the operation of the transceiver circuit 101 in accordance with software stored in memory 109. The software includes, among other things, an operating system 111, a BS signalling module 113, an AS security module 115 and a Service Request module 117. The BS signalling module 113 controls the signalling with the base station 5; the AS security module 115 provides AS security; and the service request module 117 processes received Service Requests to determine if AS security is needed for the requested service and, if it is, activates the AS security module 115.

In the above description, the base station 5, the mobile telephone 3 and the MME 8 are described, for ease of understanding, as having various discrete software modules. Whilst these software modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

Figure 5:
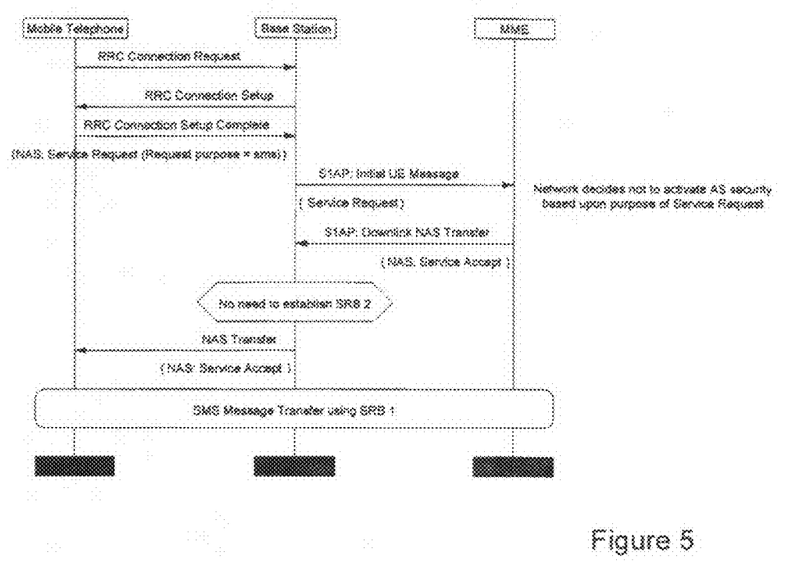
FIG. 5 is a signalling diagram illustrating the signalling performed in the system shown in FIG. 1 when a short text message is to be transmitted from the mobile telephone to the network.

FIG. 5 illustrates the modified signalling when an SMS message is to be transmitted from the mobile telephone 3 to the core network 7. As shown, the mobile telephone 3 initially sends an RRC Connection Request to the base station 5. In response, the base station 5 returns an RRC Connection setup message providing information required to setup Signalling Radio Bearer 1 (SRB1). Once established, the mobile telephone 3 issues an NAS: Service Request message which includes a parameter identifying the purpose of the request. In this case, the purpose is for an SMS message. This NAS message is transferred to the base station 5 and forwarded on to the MME 8 in an S1AP: Initial UE Message. The MME 8 receives this message and processes the Service Request from the mobile telephone 3 to determine if the purpose of the request requires activation of AS security. The MME 8 does this by comparing the parameter value in the Service Request (that identifies the purpose) with data that defines, for each possible parameter value, whether or not AS security is required.

In this example, the purpose of the Service Request is for transferring an SMS message, and so the MME 8 will determine that AS security is not required as the SMS message can be transmitted using SRB1. Therefore, in this case, the MME 8 returns a NAS: Service Accept message (without Security Parameters) in an S1AP: Downlink NAS Transfer message. The base station 5 receives this message and, because the Service Request has been accepted without providing Security Parameters, the base station 5 determines that it does not need to establish SRB2 with the mobile telephone 3. Instead, the base station 5 performs a NAS transfer to transfer the NAS: Service Accept message (without Security Parameters) to the mobile telephone 3. Upon receiving this message, the mobile telephone 3 can start to transmit the SMS message to the core network 7 using SRB1 without having to establish SRB2.

FIG. 5 illustrates the situation when the mobile telephone wants to transmit an SMS message to the network. FIG. 6 illustrates the way in which the system can operate when the network wants to transmit an SMS message to the mobile telephone 3. As can be seen by comparing FIGS. 5 and 6, the main difference in this case is that the MME 8 initiates the process by sending an S1 AP: Paging message (which is addressed to the mobile telephone 3) to the base station 5. The base station 5 then broadcasts the Paging message and it is received by the mobile telephone 3. Thereafter the processing is the same as that shown in FIG. 5 and will not be described further.

In the event that the Service Request is for establishing a mobile originating/terminating call, then the MME 8 would determine from the parameter included in the Service Request that AS security has to be activated and so would return the Service Accept message together with security parameters for setting up SRB2.

Modifications and Alternatives

A detailed embodiment has been described above. As those skilled in the art will appreciate, a number of modifications and alternatives can be made to the above embodiment whilst still benefiting from the invention embodied therein. By way of illustration only a number of these alternatives and modifications will now be described.

In the above embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephone 3 in order to update their functionalities.

In the above embodiment, a mobile telephone was provided that communicated with a number of base stations. As those skilled in the art will appreciate, the invention is applicable to other types of user equipment (UE) such as laptop computers, Personal Digital Assistants or other hand held portable computer devices.

In the above embodiment, the mobile telephone included a parameter in the Service Request which was used by the MME to determine whether or not AS security would be activated for providing the service. In the embodiment, the parameter identified the purpose of the Service Request and the MME determined (from the value of the parameter and stored data) whether or not AS security would be required. In an alternative embodiment, the mobile telephone may make this determination and then include a binary value (flag) as the value of the parameter that is transferred to the MME. In response, the MME would use AS security if the binary value was a "one" and would not use AS security if the binary value was a "zero" (or vice versa).

In the above embodiment, the SMS service was given as an example of a service that does not need AS security to be activated to provide the requested service. As those skilled in the art will appreciate, other services may not require AS security to be established.

In the above embodiment, the mobile telephone transmitted the service request and the parameter value to the base station at the same time. In another embodiment, the parameter value may be transmitted separately from the service request.

In the above embodiment, for a mobile terminated SMS message, the mobile telephone 3 transmitted the parameter value indicative of the purpose of the Service Request to the MME 8 via the base station 5. However, as the MME 8 already knows what the Service Request is about, in an alternative embodiment, the mobile telephone 3 may not transmit the parameter value (indicative of the purpose of the request) to the MME 8. Instead the MME 8 would determine whether or not AS security is needed based on its prior knowledge that an SMS message is to be transmitted to the mobile telephone 3.

The following is a detailed description of the way in which the present invention may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Introduction

Purpose of this contribution is to sum up the current status in the standard with regards to the UE-EPC Signalling transfer mechanism and identify scenarios where resources are not optimized and proposes solution to overcome this issue.

In general current mechanism in standards is to always set up the default bearer and activate the AS security whenever the UE moves from ECM_Idle to ECM_Connected Mode (except in case of Tracking area update).

However there are some use cases where the default Bearer and the AS security are not needed:

E-UTRAN 3GPP2 signaling for example for 3gpp2 pre-registration the setup of the Default Bearer is not required;

SMS transfer does not require the Default Bearer Setup, neither the AS security activation.

The setting up of default bearer and activation of AS leads to more processing in eNB and UE as well as resources being set up in eNB and EPC and not being used for the purpose of signaling transfer. This contribution proposes a mechanism to overcome this issue.

Background
Status in 24.301

The service Request procedure is needed to trigger the EMM Idle to EMM Connected transition and establish the radio and S1 bearers for the bearers already activated. In particular this procedure is needed when:
      the network has downlink signalling pending;
      the UE has uplink signalling pending;
      the UE or the network has user data pending and the UE is in EMM-IDLE mode;
      the UE in EMM-CONNECTED mode has uplink user data to be sent and the user plane radio bearers are not established; or
      the UE in EMM-IDLE or EMM-CONNECTED mode has requested to perform mobile originating/terminating CS fallback.

Status in 23.272

SA2 has decided to transfer the CS SMS via the LTE NAS message instead of using the user plane solution. Please refer to section 8.2 in 23.272.

Massage Flows According to the Current Specs

Figure 8:
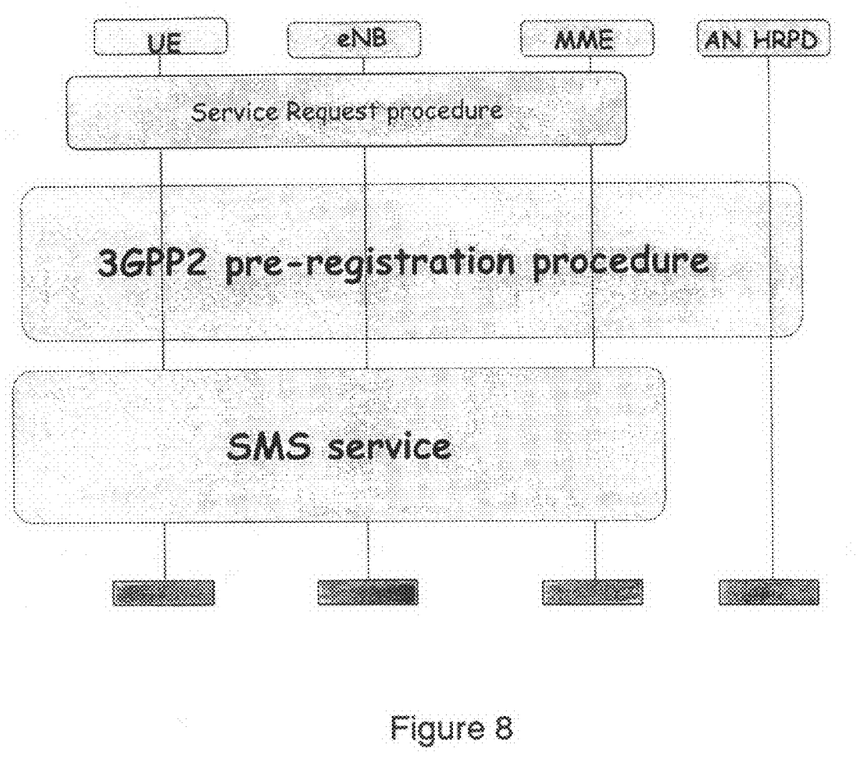
FIG. 8 is a message sequence chart of UE-EPC signalling connection establishment-use cases.

Message sequence chart shown in FIG. 8 applies where the MS has only signalling messages to be sent to the network in ECM-IDLE mode for example for use cases like SMS, 3gpp2 pre-registration procedures etc.

Discussion

In section 2 it was clarified that the Service Request procedure needs to be performed first whenever MS has any signalling messages to be sent to the network in ECM-IDLE mode. Purpose of the Service Request procedure is to both establish resources for the already activated Bearers, among these the default bearer, and trigger the ECM idle to ECM connected transition. The AS security is activated also during this procedure.

However, for the sole purpose of signalling messages transfer between the MS and EPC, it is not needed to establish resources for the default bearer or any other activated bearer. Furthermore, some use cases have been identified where the AS security activation is also not needed (e.g. in this case the MME would reply to the S1 AP: Initial UE message with DL NAS Transfer message instead of Initial Context Setup Request)

Following solution is proposed

Introducing a new IE in the service Request message indicating the purpose of the service request procedure so that the MME can decide whether to establish resources for bearer establishment and to activate the AS security based on this parameter . . . .

Below are the message flows of some use cases where an optimized procedure for UE-EPC signalling connection establishment is needed.

Figure 9:
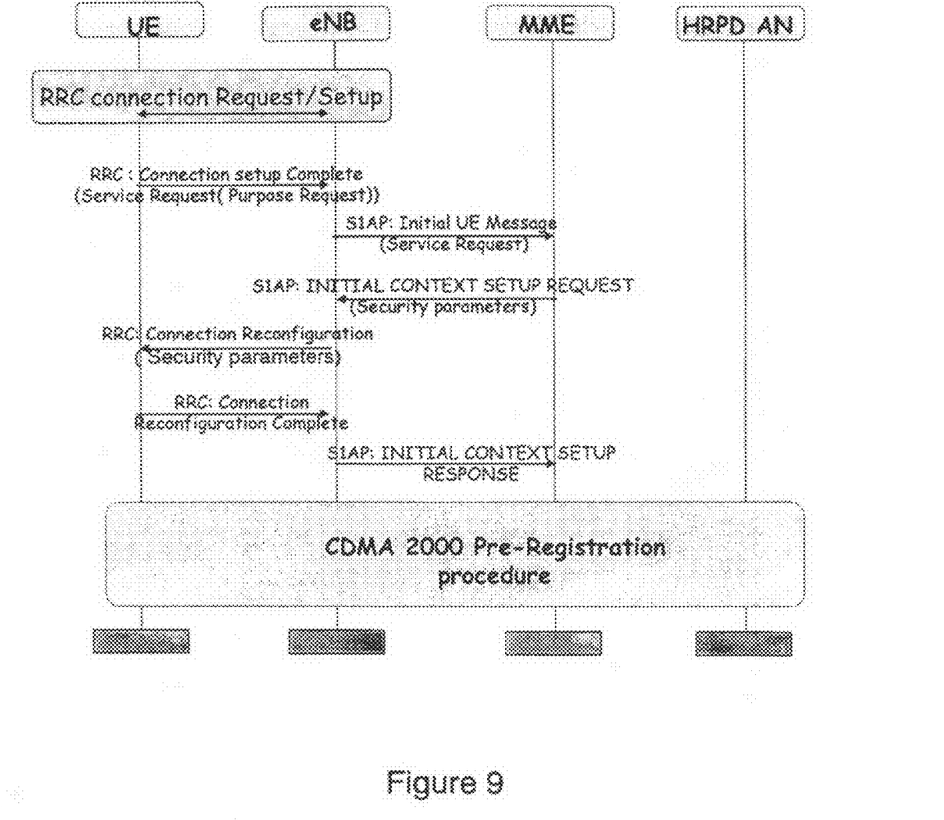
FIG. 9 is a message sequence chart of Optimization of UE-MME connection establishment procedure during CDMA2000 pre-registration procedure.

In particular:

The CDMA 2000 pre-registration procedure does not require the establishment of the resources for the default Bearer while it requires the AS security to be activated (FIG. 9)

Figure 10:
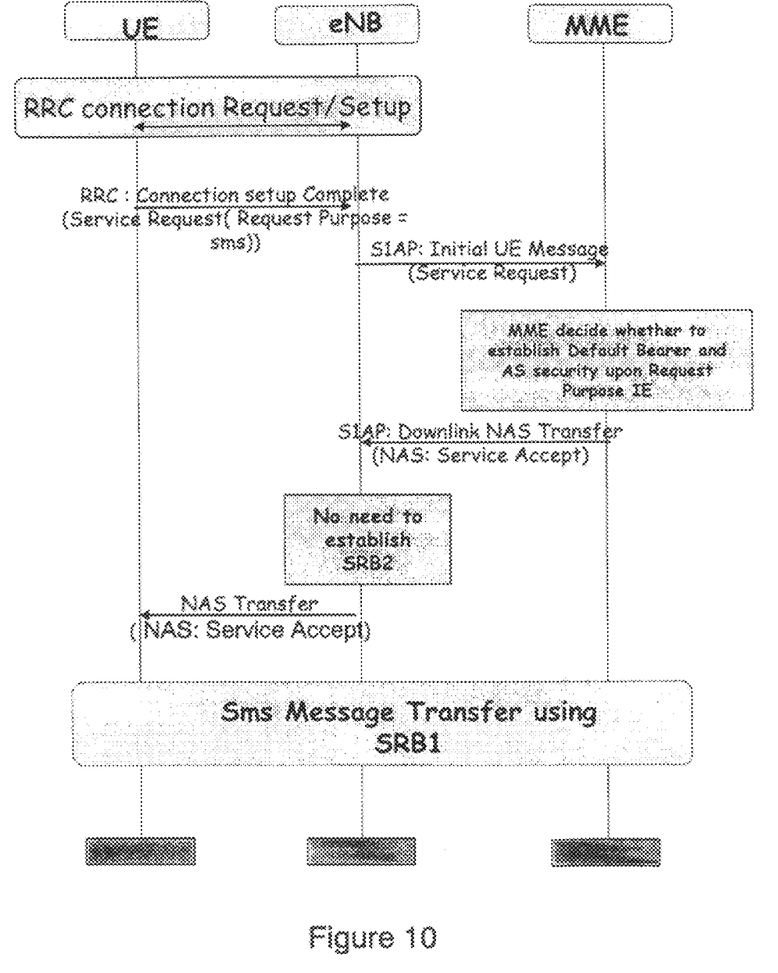
FIG. 10 is a message sequence chart of Optimization of UE-MME connection establishment procedure during sms service transfer procedure.

The short message Transfer service transfer does not require the establishment of the resources for the default Bearer, neither AS security activation since the NAS security is already in place (FIG. 10).

Alternatively, instead of using the Initial Context Setup, a new S1 AP procedure may be defined with the only purpose of setting up the security context in the eNB.

Summary of Changes Required:

a new IE in the already existing Service Request NAS message need to be introduced.

The "Aggregate Maximum Bit Rate" and "SAE Bearer to Be Setup List "need to be optional in the INITIAL CONTEXT SETUP REQUEST message or alternatively a new S1 AP procedure may be defined with the only purpose of setting up the security context in the eNB.

CONCLUSION

In this contribution we have clarified how the UE currently performs the UE-EPC Signalling transfer mechanism when in idle state and proposed solutions to optimize the procedure.

It is proposed to discuss the proposed optimized procedure, liaise with the relevant groups for the changes required to implement the optimization in the specs and agree on the attached CR [1] against 36.413.

REFERENCE

[1] R3-081995 Resource Optimization for UE-EPC Signalling transfer, NEC

This application is based upon and claims the benefit of priority from United Kingdom patent application No. 0814731.6, filed on Aug. 12, 2008, the disclosure of which is incorporated herein in its entirety by reference.

The invention claimed is:

1. A mobile communications system, comprising:
a mobile communications device;
a base station; and
a network communications node,
wherein the mobile communications device comprises:
    means for generating a Service Request;
    means for sending the Service Request to the base station;
    means for receiving a Service Accept message from the base station without reconfiguration data; and
    means for transferring data with the base station using an existing radio bearer to provide a service requested in the Service Request,
wherein the base station comprises:
    a first receiver for receiving the Service Request from the mobile communications device;
    a first sender for sending the Service Request to the network communications node;
    a second receiver for receiving a Service Accept message from the network communications node;
    a second sender for sending the Service Accept message to the mobile communications device without reconfiguration data; and means for transferring data with the mobile communications device using an existing radio bearer to provide the service requested in the Service Request, and
wherein the network communications node comprises:
means for receiving a Service Request from a base station;
means for obtaining a parameter value that depends upon a purpose of the Service Request;
means for determining if security is required to be activated for the requested service based on said parameter value; and
means for sending a Service Accept message to the base station without security parameters if said determining means determines that security is not required to be activated and for sending a Service Accept message to the base station with security parameters if said means for determining determines that security is required to be activated.

2. A system according to claim 1, wherein said means for sending the Service Request sends the parameter value to the base station.

3. A mobile communications devices, comprising:
means for generating a Service Request;
means for sending the Service Request to a base station;
means for receiving a Service Accept message from the base station without reconfiguration data;
means for transferring data with the base station using an existing radio bearer to provide a service requested in the Service Request; and
means for generating a parameter value that depends upon a purpose of the Service Request, said means for sending being operable to send the generated parameter value to the base station.

4. A device according to claim 3, wherein said means for sending is operable to send said parameter value and said Service Request together to said base station.

5. A device according to claim 3, wherein said means for generating is operable to generate said parameter value in dependence upon whether or not security will have to be activated to provide the service requested.

6. A device according to claim 5, wherein said means for generating is operable to generate a parameter value which comprises a binary value in dependence upon whether or not the security will have to be activated to provide the service requested.

7. A device according to claim 3, wherein said Service Request is for a short messaging service.

8. A device according to claim 3, wherein said means for sending is operable to use a first signalling radio bearer to send said Service Request, and
wherein said means for transferring is operable to use a same signalling radio bearer to transfer said data with the base station.

9. A device according to claim 3, wherein said means for generating generates a binary value depending upon whether security will be activated to provide the service requested.

10. A base station for use in a mobile communications system, the base station comprising:
a first receiver for receiving a Service Request from a mobile communications device;
a first sender for sending the Service Request to a network communications node;
a second receiver for receiving a Service Accept message from the network communications node;
a second sender for sending the Service Accept message to the mobile communications device without reconfiguration data; and
a transferring device that transfers data with the mobile communications device using an existing radio bearer to provide a service requested in the Service Request,
wherein said first receiver is operable to receive a parameter value that depends upon a purpose of the Service Request from the mobile communications device, and
wherein said first sender is operable to send the parameter value to the network communications node.

11. A base station according to claim 10, wherein said first receiver is operable to receive the Service Request and the parameter value together.

12. A base station according to claim 10, wherein said first sender is operable to send the Service Request and the parameter value together.

13. A base station according to claim 10, wherein said first receiver and said second sender are operable to use a first signalling radio bearer.

14. A base station according to claim 13, wherein said transferring device is operable to use said first signalling radio bearer to transfer said data with the mobile communications device.

15. A base station according to claim 10, wherein said Service Request is for a short messaging service.

16. A network communications node for use in a mobile communications system, the network communications node comprising:
means for receiving a Service Request from a base station;
means for obtaining a parameter value that depends upon a purpose of the Service Request;
means for determining if security is required to be activated for a requested service based on said parameter value; and
means for sending a Service Accept message to the base station without security parameters if said determining means determines that security is not required to be activated and for sending a Service Accept message to the base station with security parameters if said determining means determines that security is required to be activated.

17. A network communications node according to claim 16, wherein said means for receiving is operable to receive said parameter value from said base station, and
wherein said means for obtaining is operable to obtain said parameter value from said receiving means.

18. A network communications node according to claim 17, wherein said means for receiving is operable to receive the Service Request and the parameter value together.

19. A network communications node according to claim 16, wherein said parameter value identifies the requested service, and
wherein said determining means is operable to compare the parameter value with stored data to determine whether or not security is required to be activated.

20. A network communications node according to claim 16, wherein said parameter value comprises a binary value, and
wherein said determining means is operable to determine whether or not security is required to be activated based on the binary value of said parameter.

21. A network communications node according to claim 16, wherein, if said determining means determines that security is to be activated, the network communications node is operable to cause the base station to establish another signalling radio bearer with the mobile communications device on which data to be transferred between the base station and the mobile communications device is to be carried.

22. A network communications node according to claim 16, wherein said Service Request is for a short message service, and
wherein said determining means is operable to determine from said parameter value that security is not required to be activated to provide the requested service.

23. A mobile communications method performed in a mobile communications system comprising a mobile communications device, a base station and a network communications node, the method comprising:
at the mobile communications device:
generating a Service Request;
sending the Service Request to the base station;
receiving a Service Accept message from the base station without reconfiguration data; and
transferring data with the base station using an existing radio bearer to provide a service requested in the Service Request;
at the base station:
a first receiving of the Service Request from the mobile communications device;
a first sending of the Service Request to the network communications node;
a second receiving of a Service Accept message from the network communications node;
a second sending of the Service Accept message to the mobile communications device without reconfiguration data; and
transferring data with the mobile communications device using an existing radio bearer to provide the service requested in the Service Request;
at the network communications node:
receiving a Service Request from the base station;
obtaining a parameter value that depends upon a purpose of the Service Request;
determining if security is required to be activated for the requested service based on said parameter value; and
sending a Service Accept message to the base station without security parameters if said determining determines that security is not required to be activated and for sending a Service Accept message to the base station with security parameters if said determining determines that security is required to be activated.

24. A method performed by a mobile communications device, the method comprising:
generating a Service Request;
sending the Service Request to a base station;
receiving a Service Accept message from the base station without reconfiguration data;
transferring data with the base station using an existing radio bearer to provide a service requested in the Service Request; and
generating a parameter value that depends upon a purpose of the Service Request,
wherein, in said sending the Service Request, the generated parameter value is sent to the base station.

25. A method performed by a base station of a mobile communications system, the method comprising:
a first receiving of a Service Request from a mobile communications device;
a first sending of the Service Request to a network communications node;
a second receiving of a Service Accept message from the network communications node;
a second sending of the Service Accept message to the mobile communications device without reconfiguration data;
transferring data with the mobile communications device using an existing radio bearer to provide a service requested in the Service Request; and
generating a parameter value that depends upon a purpose of the Service Request,
wherein the mobile communications device sends the generated parameter value to the base station.

26. A method performed by a network communications node of a mobile communications system, the method comprising:
receiving a Service Request from a base station;
obtaining a parameter value that depends upon a purpose of the Service Request;
determining if security is required to be activated for a requested service based on said parameter value; and
sending a Service Accept message to the base station without security parameters if said determining determines that security is not required to be activated and for sending a Service Accept message to the base station with security parameters if said determining determines that security is required to be activated.

27. A mobile communications device comprising control circuitry operable to:
generate a Service Request;
send the Service Request to a base station;
receive a Service Accept message from the base station without reconfiguration data;
transfer data with the base station using an existing radio bearer to provide a service requested in the Service Request; and
generate a parameter value that depends upon a purpose of the Service Request,
wherein, in said send the Service Request, the generated parameter value is sent to the base station.

28. A base station for use in a mobile communications system, the base station comprising control circuitry operable to perform:
a first receiving of a Service Request from a mobile communications device;
a first sending of the Service Request to a network communications node;
a second receiving of a Service Accept message from the network communications node;
a second sending of the Service Accept message to the mobile communications device without reconfiguration data;
a transferring of data with the mobile communications device using an existing radio bearer to provide a service requested in the Service Request; and
generating a parameter value that depends upon a purpose of the Service Request,
wherein the mobile communications device sends the generated parameter value to the base station.

29. A network communications node for use in a mobile communications system, the network communications node comprising a controller operable to:
receive a Service Request from a base station;
obtain a parameter value that depends upon a purpose of the Service Request;
determine if security is required to be activated for a requested service based on said parameter value; and send a Service Accept message to the base station without security parameters if it is determined that security is not required to be activated and for sending a Service Accept message to the base station with security parameters if it is determined that security is required to be activated.

* * * * *